United States Patent
Hays

(10) Patent No.: US 7,523,639 B2
(45) Date of Patent: Apr. 28, 2009

(54) FLOW METER TYPE IDENTIFICATION

(75) Inventor: Paul J. Hays, Lafayette, CO (US)

(73) Assignee: Micro Motion, Inc., Boulder, CO (US)

( * ) Notice: Subject to any disclaimer, the term of this patent is extended or adjusted under 35 U.S.C. 154(b) by 398 days.

(21) Appl. No.: 10/581,735

(22) PCT Filed: Dec. 10, 2003

(86) PCT No.: PCT/US03/39387

§ 371 (c)(1),
(2), (4) Date: Jun. 6, 2006

(87) PCT Pub. No.: WO2005/062003

PCT Pub. Date: Jul. 7, 2005

(65) Prior Publication Data

US 2007/0193334 A1   Aug. 23, 2007

(51) Int. Cl.
*G01F 25/00* (2006.01)
*G01F 15/06* (2006.01)
*G01F 15/00* (2006.01)

(52) U.S. Cl. .................. 73/1.34; 73/272 A; 702/116
(58) Field of Classification Search ............. 73/1.34, 73/272 R, 272 A; 702/16
See application file for complete search history.

(56) References Cited

U.S. PATENT DOCUMENTS

| 3,487,826 | A | * | 1/1970 | Barefoot | 600/505 |
|---|---|---|---|---|---|
| RE31,450 | E | * | 11/1983 | Smith | 73/861.356 |
| 4,491,025 | A | * | 1/1985 | Smith et al. | 73/861.355 |
| 5,680,409 | A | * | 10/1997 | Qin et al. | 702/116 X |
| 6,296,148 | B1 | * | 10/2001 | Myers et al. | 222/71 |
| 6,318,186 | B1 | | 11/2001 | Smith et al. | |
| 6,358,215 | B1 | * | 3/2002 | Ricciardelli | 600/532 |
| 6,446,512 | B2 | * | 9/2002 | Zimmerman et al. | 73/861.12 |
| 6,450,818 | B1 | * | 9/2002 | Ogawa et al. | 434/118 |
| 2002/0133307 | A1 | | 9/2002 | Maginnis | |
| 2004/0019448 | A1 | * | 1/2004 | Taguchi et al. | 702/116 |
| 2004/0261492 | A1 | * | 12/2004 | Zarkar et al. | 73/1.34 |

FOREIGN PATENT DOCUMENTS

| GB | 2345974 A | | 7/2000 |
|---|---|---|---|
| JP | 2002122459 A | * | 4/2002 |
| SU | 1778529 A1 | | 11/1992 |
| WO | WO-9321505 A | | 10/1993 |
| WO | WO-0101084 A1 | | 1/2001 |
| WO | WO-0153781 A1 | | 7/2001 |

* cited by examiner

*Primary Examiner*—Thomas P Noland
(74) *Attorney, Agent, or Firm*—The Ollila Law Group LLC

(57) ABSTRACT

A flow meter monitoring system (100) is provided according to an embodiment of the invention. The flow meter monitoring system (100) includes a communication interface (101) configured to communicate with one or more flow meters and receive meter calibration values for a flow meter of the one or more flow meters. The flow meter monitoring system (100) further includes a processing system (102) in communication with the communication interface (101) and configured to receive the meter calibration values from the communication interface and correlate the meter calibration values to known meter calibration values (114) in order to determine the flow meter type.

29 Claims, 3 Drawing Sheets

FLOW METER TYPE IDENTIFICATION

BACKGROUND OF THE INVENTION

1. Field of the Invention

The present invention relates to flow meter type identification, and more specifically to flow meter type identification using meter calibration values.

2. Statement of the Problem

Flow meters are used to measure the mass flow rate of flowing liquids. Many types of flow meters exist and accommodate a variety of applications and flowing materials. For example, there may be different flow meter types/models for different flowtube line sizes, tube materials, pressure ratings, temperature ratings, accuracy ratings, etc. Each flow meter type may have unique characteristics which a flow meter system must account for in order to achieve optimum performance. For example, some flow meter types may require a flowtube apparatus to vibrate at particular displacement levels. In another example, some flow meter types can require special compensation algorithms.

Flow meter electronics typically include stored meter calibration values. The flow meter uses these meter calibration values in order to accurately measure mass flow rate and density. The meter calibration values can comprise calibration values derived from measurements under test conditions, such as at the factory. Therefore, each flow meter can have unique calibration values.

One type of flow meter is a Coriolis flow meter. It is known to use Coriolis mass flow meters to measure mass flow and other information of materials flowing through a pipeline as disclosed in U.S. Pat. No. 4,491,025 issued to J. E. Smith, et al. of Jan. 1, 1985 and Re. 31,450 to J. E. Smith of Feb. 11, 1982. These flow meters have one or more flow tubes of different configurations. Each conduit configuration may be viewed as having a set of natural vibration modes including, for example, simple bending, torsional, radial and coupled modes. In a typical Coriolis mass flow measurement application, a conduit configuration is excited in one or more vibration modes as a material flows through the conduit, and motion of the conduit is measured at points spaced along the conduit. The vibrational modes of the material filled systems are defined in part by the combined mass of the flow tubes and the material within the flow tubes. When there is no material flowing through the flow meter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors are placed at different points on the flow tube to produce sinusoidal signals representative of the motion of the flow tube at the different points. A phase difference of the signals received from the sensors is calculated in units of time. The phase difference between the sensor signals is proportional to the mass flow rate of the material flowing through the flow tube or flow tubes.

The mass flow rate of the material is determined by multiplying the phase difference by a Flow Calibration Factor (FCF). Prior to installation of the flowmeter into a pipeline, the FCF is determined by a calibration process. In the calibration process, a fluid is passed through the flow tube at a given flow rate and the relationship between the phase difference and the flow rate is calculated (i.e., the FCF). The flow meter subsequently determines a flow rate by multiplying the FCF by the phase difference of the two pickoff signals. In addition, other calibration factors can be taken into account in determining the flow rate.

Many flow meter applications comprise a flow meter network that includes multiple individual flow meters operating within a communication network of some manner. The network commonly includes a flow meter monitoring system that gathers measured flow data and controls and coordinates operations of various flow meters. The flow meter network may include flow meters of different sizes, models, model years, and electronics and software versions. In such a setting, it is desirable that the flow meter type be easily and automatically identified so that maintenance and upgrading procedures can be efficiently and properly performed.

When electronic flow meters were initially developed, the identification and tracking of flow meter type was not an issue. This was due to the relatively few flow meter manufacturers and few flow meter models. As a result, manual tracking and record-keeping of flow meter types was easy. However, it is impossible to design flow meters without designing for unique characteristics for specific and varying applications and while yet achieving lower costs, higher performance, smaller footprints, and other aspects desirable of a flow meter. As a result, the number of flow meter types has proliferated in order to suit specific and wide-ranging needs.

One prior art approach requires a user to enter the sensor model/type into a flow meter monitoring device, such as by entering a code or identifier. This approach is acceptable if the person doing the entering is knowledgeable about flow meters and flow meter types. However, this prior art approach has drawbacks. This prior art approach relies on the person doing the entering to have at least some familiarity with flow meter types, relies on the person to know how to input data into the transmitter or monitoring device, and relies on complete, error-free, and accurate entry of the code or identifier.

Another prior art approach has been to include a memory device in a flow meter. The memory stores a flow meter type data as a readable code or identifier. A remote flow meter monitoring system can query the memory to obtain the flowmeter type code or identifier. However, this prior art approach also has drawbacks. A memory device is a significant cost addition to a flow meter. In addition, the memory device, such as a solid state memory, is a relatively fragile device that is not suited for inclusion in a high temperature and high vibration environment of a flow meter.

Yet another prior art approach is the inclusion of a resistor into a flow meter, wherein the resistor generates a relatively unique electrical voltage/current response that is remotely read. A resistor is an inexpensive and robust device that can be easily integrated into a flow meter. However, this prior art approach also has drawbacks. The increasing number of flow meter types necessitates the use of smaller and smaller resistance ranges to delineate each flow meter model. This leads to uncertainties when the resistance tolerance is critical. In addition, global flowmeter type identification would require coordination between flow meter manufacturers.

Yet another prior art approach is to induce an initial vibration of the subject flow meter and measure the resulting frequency of vibration of the flowtube. The resulting vibration frequency is then correlated to a flow meter type. However, this prior art approach also has drawbacks. The vibration test must be properly conducted and the flow meter has to be set to the appropriate test conditions. Further, the test may result in a measured response vibration that doesn't fully indicate the flow meter type. Flow meter tolerance variations, together with variations in the ambient conditions, may result in an incorrect flowmeter type determination.

SUMMARY OF THE SOLUTION

The above and other problems are solved and an advance in the art is achieved through the provision of a system and method for flow meter type identification.

A flow meter monitoring system is provided according to an embodiment of the invention. The flow meter monitoring system comprises a communication interface configured to communicate with one or more flow meters and receive meter calibration values for a flow meter of the one or more flow meters. The flow meter monitoring system further comprises a processing system in communication with the communication interface and configured to receive the meter calibration values from the communication interface and correlate the meter calibration values to known meter calibration values in order to determine the flow meter type.

A flow meter type identification method for determining a flow meter type of a flow meter is provided according to an embodiment of the invention. The method comprises receiving meter calibration values for the flow meter and correlating the meter calibration values to known meter calibration values in order to determine the flow meter type.

A software product for determining a flow meter type of a flow meter is provided according to an embodiment of the invention. The software product comprises a control software configured to direct a processing system to receive meter calibration values for the flow meter and correlate the meter calibration values to known meter calibration values in order to determine the flow meter type. The software produce further comprises a storage system that stores the control software.

The following sets forth aspects of the invention. In one aspect of the invention the meter calibration values include a Flow Calibration Factor (FCF) and a quiescent harmonic frequency (K1) value.

In another aspect of the invention, the known meter calibration values comprise a data structure that links a specific flow meter type to a specific set of meter calibration values.

In yet another aspect of the invention, a determined flow meter type is stored in a data structure along with a flow meter identifier of the flow meter.

In yet another aspect of the invention, the meter calibration values for the flow meter are received from the flow meter.

In yet another aspect of the invention, the meter calibration values for the flow meter are received through a user interface.

In yet another aspect of the invention, the flow meter monitoring system comprises a flow meter component.

DETAILED DESCRIPTION OF THE INVENTION

Figure 1:
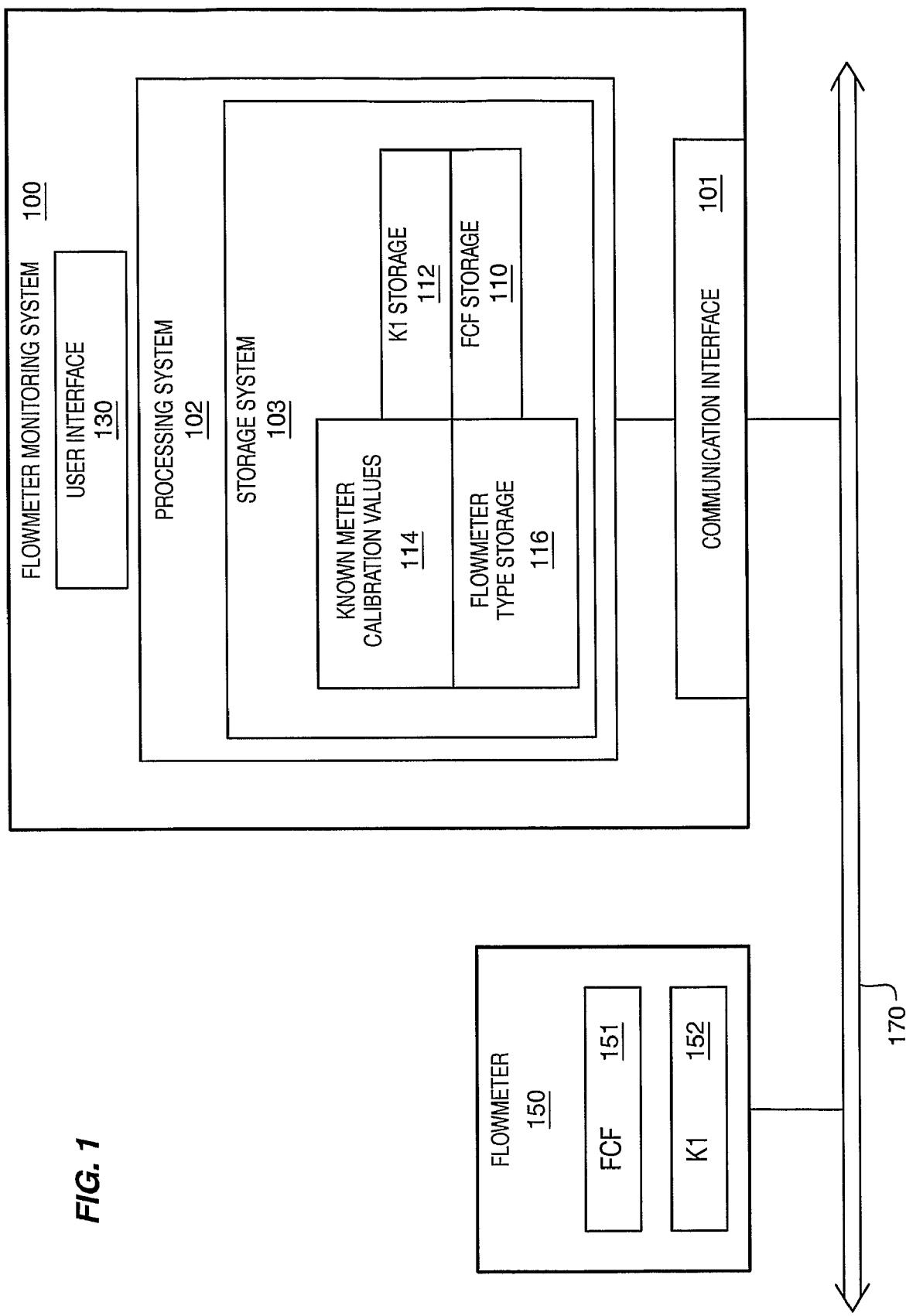
FIG. 1 shows a flow meter monitoring system according to an embodiment of the invention.
Figure 2:
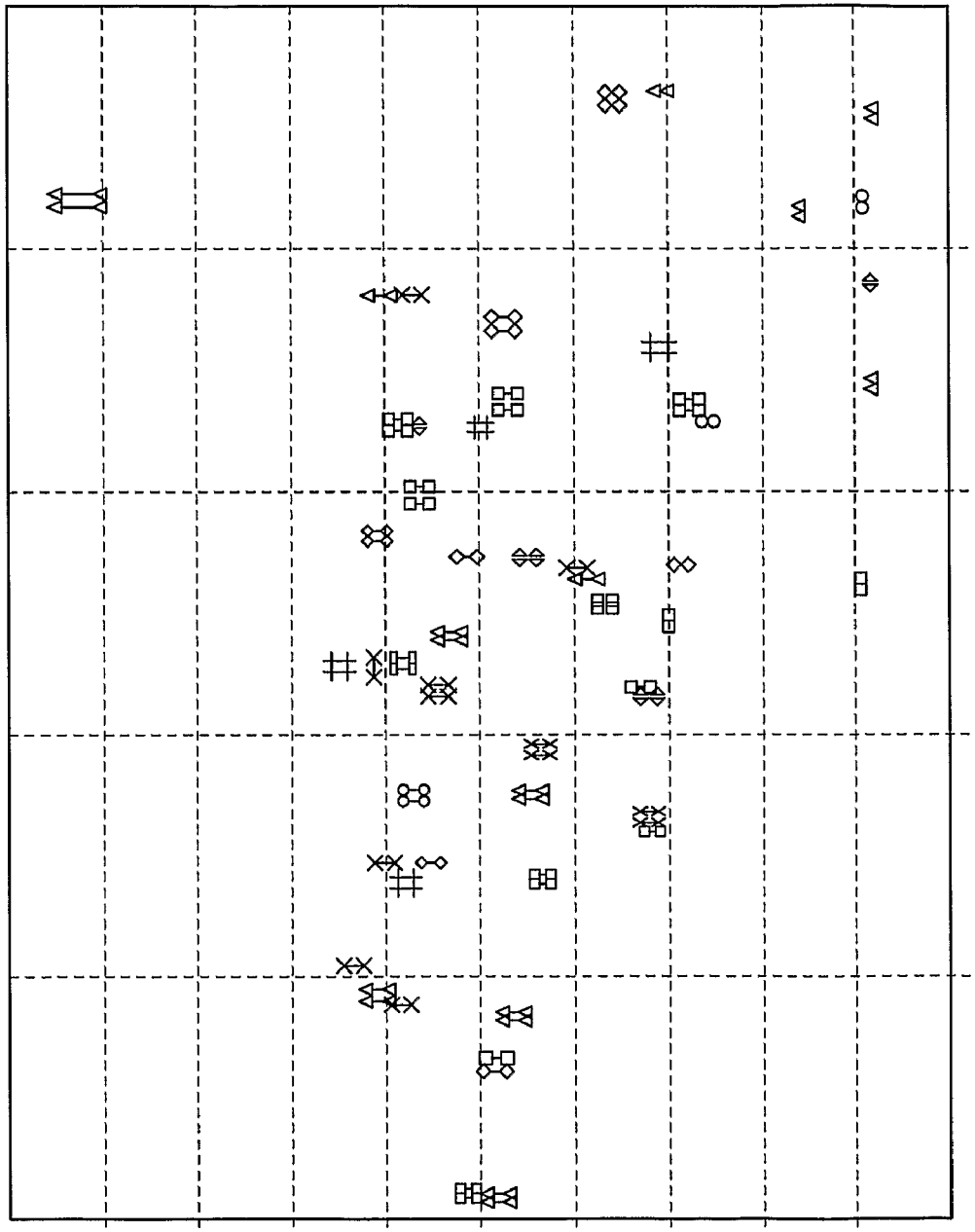
FIG. 2 is a chart that shows the relationship between some flow meter types and the FCF and K1 values.
Figure 3:
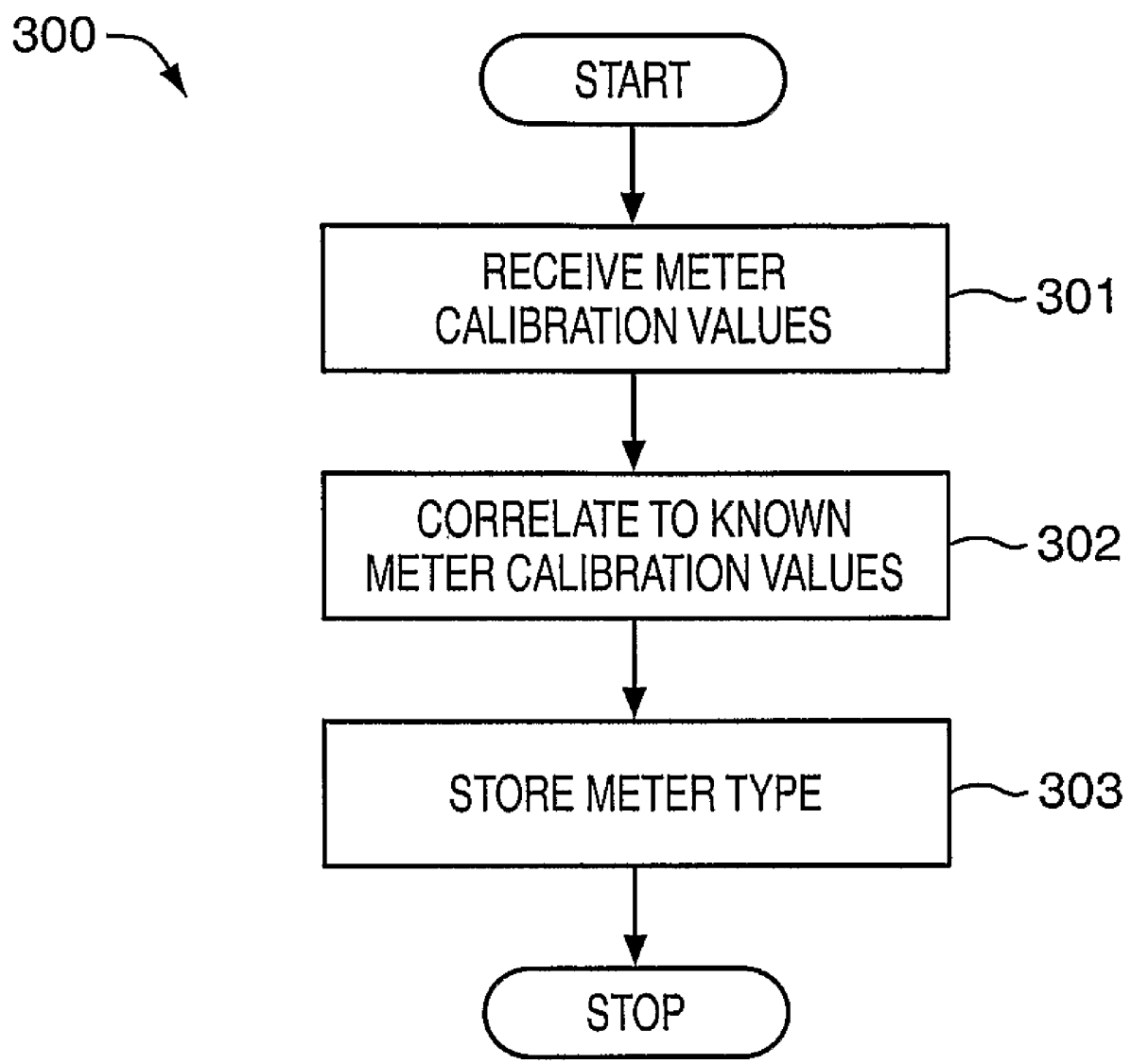
FIG. 3 is a flowchart of a flow meter type identification method according to an embodiment of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. The examples below have been expressed using two modes for brevity. It is to be understood that more than two modes can be used. Those skilled in the art will appreciate that the features described below can be combined in various ways to form multiple variations of the invention. As a result, the invention is not limited to the specific examples described below, but only by the claims and their equivalents.

FIG. 1 shows a flow meter monitoring system 100 according to an embodiment of the invention. The flow meter monitoring system 100 can comprise an individual flow meter, a flow meter transmitter, a remote terminal, etc. The flow meter monitoring system 100 can gather measured flow data and can control and coordinate the operations of one or more various flow meters. In some embodiments, the flow meter monitoring system 100 can communicate with one or more flow meters 150, such as via a network 170 in one embodiment.

The flow meter 150 can comprise a Coriolis flow meter, for example. The flow meter 150 can include stored meter calibration values, such as a Flow Calibration Factor (FCF) 151 and a quiescent harmonic frequency (K1) value 152. The FCF represents the flowtube geometry of the specific flow meter apparatus. The FCF can account for variations in flowtube apparatus dimensions during manufacture and can also account for variations in vibrational response due to variation in properties of the flowtube material. The K1 value represents a quiescent harmonic frequency of the flowtube apparatus as measured with air in the flowtube apparatus and at a calibration temperature of 0° Centigrade. The K1 value typically is in units of frequency or in units of time (i.e., a wave period). Other meter calibration values (not shown) can comprise, but are not limited to, a K value (same as K1 but for water in the flow meter apparatus), a K3 value for flow effect of density, a temperature calibration value, etc. Other meter calibration values are contemplated and are included within the scope of the invention and claims.

The flow meter monitoring system 100 in one embodiment includes a communication interface 101 and a processing system 102, and can include a user interface 130. The flow meter monitoring system 100 receives meter calibration values for the flow meter 150. The flow meter monitoring system 100 uses the meter calibration values to determine a flow meter type of the flow meter 150.

In an alternative embodiment, the flow meter monitoring system 100 comprises a flow meter component, i.e., the flow meter monitoring system 100 comprises a part of the flow meter 150. Consequently, the flow meter 150 can use the meter calibration values to determine its own flow meter type. In addition, the flow meter 150 can receive meter calibration values from other flow meters and identify the meter types.

The flow meter type is dictated by factors including the manufacturer, the accuracy rating of the flowtube apparatus, the pressure rating, the temperature rating, the material or materials used in forming the flowtube apparatus, and the line size of the tubing forming the flow meter. Each of these flow meter characteristics can affect or control the determination of the flow meter type (see FIG. 2 and the accompanying discussion).

Advantageously, the flow meter monitoring system 100 can remotely read the meter calibration values, such as obtaining the meter calibration values from the flow meter 150 through the communication interface 101. The values can be read over a bus or communication link or can be read via a wireless link. The values can be read at any time. Alternatively, the meter calibration values can be directly entered into the flow meter monitoring system 100 by a user through the user interface 130. In another alternative, the meter calibration values can be obtained from other remote devices through the communication interface 101.

The meter calibration values are used in operation by the flow meter electronics of the flow meter 150 to calibrate a mass flow measurement. The meter calibration values are typically obtained by measurement at the factory, under test conditions. The meter calibration values are commonly stored in the meter electronics before the flow meter is shipped from the factory. In addition, the meter calibration values can be programmed or re-programmed into the meter electronics by a user in the field. Advantageously, if the subject flow meter 150 is re-configured, the values can be re-programmed so that the subject flow meter 150 still can be identified according to the invention. This programming is typically facilitated by a tag attached to the flow meter, with the tag being stamped, embossed, or printed with the factory-measured meter calibration values. Therefore, the user can re-program the flow meter with correct calibration information if required, such as in the event of power loss, memory loss, re-configuration, etc., of the flow meter.

The communication interface 101 is configured to communicate with the flow meter 150 and other flow meters, and can also be used to communicate with other flow meter network devices. The communication interface 101 can receive the meter calibration values from the flow meter 150, for example. Alternatively, the communication interface 101 can receive the meter calibration values from a remote terminal or device.

The communication interface 101 can comprise any type of communication device. In one embodiment the communication interface 101 comprises a modem, network card, etc., configured to communicate over a network 170. The network 170 can comprise a wire network, including a switched network or a digital packet network. In another embodiment the communication interface 101 comprises a wireless communication device, such as a radio or optical receiver or transceiver, for example.

The processing system 102 conducts operations of the flow meter monitoring system 100. The processing system 102 communicates with the communication interface 101 and is configured to receive the meter calibration values from the communication interface 101 and correlate the meter calibration values to known meter calibration values to determine the flow meter type of the flow meter 150. The processing system 102 can comprise a general purpose computer, a microprocessing system, a logic circuit, or some other general purpose or customized processing device. The processing system 102 may be distributed among multiple processing devices. The processing system 102 can include any manner of integral or independent electronic storage medium, such as the storage system 103, for example.

The storage system 103 can include a FCF storage 110, a K1 storage 112, known meter calibration values 114, and a flow meter type storage 116. The FCF storage 110 and the K1 storage 112 can store received FCF and K1 values for flow meter type identification. The known meter calibration values 114 can comprise a data structure that stores known values used for identifying a flow meter type (discussed below). For example, the known meter calibration values 114 can comprise a data table. However, it should be understood that other data structures can be used to store and correlate meter calibration values. The flow meter monitoring system 100 can store the determined flow meter type identification in the flow meter type storage 116.

In one embodiment, the know meter calibration values are stored in a correlation table 114. The correlation table 114 includes multiple meter type records. A meter type record of the correlation table 114 includes a set of known meter calibration values and a corresponding meter type for the set of known meter calibration values. Therefore, for an input of a particular set of meter calibration values, the correlation table 114 outputs a unique flow meter type matching the particular set of meter calibration values.

FIG. 2 is a chart that shows the relationship between some flow meter types and the FCF and K1 values. It should be noted that not all flow meter types are shown in the chart. It can be seen from the chart that the FCF and K1 values for each represented flow meter type are tightly clustered. Therefore, by correlating a subject flow meter's meter calibration values to these known parameters and clusters, the flow meter type of the subject flow meter 150 can be determined.

FIG. 3 is a flowchart 300 of a flow meter type identification method according to an embodiment of the invention. The flow meter type identification method can be performed by the flow meter monitoring system 100 of FIG. 1, and can be embodied in a software product. The software product can be executing on a flow meter monitoring system 100. In step 301, meter calibration values are received for a flow meter to be identified. As previously discussed, the meter calibration values can include the FCF and the K1 value. The meter calibration values can be concurrently or previously received from the subject flow meter 150, can be concurrently or previously received from a user through a user interface, or can be concurrently or previously received from a remote terminal.

In step 302, the received meter calibration values are correlated to known meter calibration values that are substantially representative of various flow meter types. The correlation can be performed by substantially matching the meter calibration values of the subject flow meter 150 to known meter calibration values. The correlation can be accomplished through the use of a data structure of some manner, such as a data table, for example.

In optional step 303, the determined flow meter type is stored. The determined flow meter type can be stored in a data structure of some manner, along with a flow meter identifier of the subject flow meter 150. The flow meter identifier can be any manner of network address, flow meter number, flow meter serial number, assigned flow meter number, etc., that is used to identify the subject flow meter 150. The flow meter type can comprise a Coriolis flow meter type, for example.

The flow meter monitoring system 100 (and method) advantageously can determine the flow meter type by correlating the FCF and the K1 value to known flow meter types. These two pieces of information are employed in all Coriolis flow meters and are sufficient to accurately characterize a Coriolis flow meter. The invention therefore can determine the characteristics of the flow meter, including, for example, the manufacturer, the flowtube apparatus line size, the flowtube apparatus material(s), the flowtube apparatus pressure rating, the flowtube apparatus temperature rating, and the flowtube apparatus accuracy rating.

The flow meter type identification system and method according to the invention differ from the prior art in that meter calibration values are used to determine the flow meter type. No extra codes or identifiers need to be entered by a user. The user does not have to perform any extra steps in order to enable the flow meter type identification.

The flow meter type identification according to the invention can be implemented according to any of the embodiments in order to obtain several advantages, if desired. The flow meter type identification provides a low cost flow meter type determination. No extra hardware is needed in a flow meter or in a flow meter monitoring system, and the invention can be implemented through additional software routines. The flow meter type identification provides accurate and reliable flow meter type identification, without the introduction of additional reliability issues. The flow meter type identification provides a flow meter type identification that does not require any additional actions or operations on the part of a user or system operator. The flow meter type identification provides a flow meter type identification that uses information inherent within a flow meter or within a flow meter system or network. Moreover, the flow meter type identification provides a flow meter type identification that can inform a user of an entry error in the FCF or K1 values if the determined flow meter type differs from an expected flow meter type.

I claim:

1. A flow meter monitoring system (100), comprising:
   a communication interface (101) configured to communicate with one or more flow meters and receive meter calibration values for a flow meter of the one or more flow meters; and
   a processing system (102) in communication with the communication interface (101) and configured to receive the meter calibration values from the communication interface (101) and correlate the meter calibration values to known meter calibration values (114) in order to determine the flow meter type.

2. The flow meter monitoring system (100) of claim 1 with the meter calibration values comprising a Flow Calibration Factor (FCF).

3. The flow meter monitoring system (100) of claim 1 with the meter calibration values comprising a quiescent harmonic frequency (K1) value.

4. The flow meter monitoring system (100) of claim 1 with the known meter calibration values (114) comprising a data structure that links a specific flow meter type to a specific set of meter calibration values.

5. The flow meter monitoring system (100) of claim 1 with the processing system (102) being further configured to store the determined flow meter type in a data structure along with a flow meter identifier of the flow meter.

6. The flow meter monitoring system (100) of claim 1 wherein the meter calibration values for the flow meter are received from a flow meter.

7. The flow meter monitoring system (100) of claim 1 wherein the meter calibration values for the flow meter are received through a user interface (130).

8. The flow meter monitoring system (100) of claim 1 with the flow meter type comprising a Coriolis flow meter type.

9. The flow meter monitoring system (100) of claim 1 wherein the flow meter monitoring system comprises a flow meter component.

10. A flow meter type identification method for determining a flow meter type of a flow meter, comprising:
    receiving meter calibration values for the flow meter; and
    correlating the meter calibration values to known meter calibration values (114) in order to determine the flow meter type.

11. The method of claim 10 with the meter calibration values comprising a Flow Calibration Factor (FCF).

12. The method of claim 10 with the meter calibration values comprising a quiescent harmonic frequency (K1) value.

13. The method of claim 10 with the known meter calibration values (114) comprising a data structure that links a specific flow meter type to a specific set of meter calibration values.

14. The method of claim 10 further comprising storing the determined flow meter type in a data structure along with a flow meter identifier of the flow meter.

15. The method of claim 10 wherein the meter calibration values for the flow meter are received from the flow meter.

16. The method of claim 10 wherein the meter calibration values for the flow meter are received through a user interface (130).

17. The method of claim 10 with the correlating occurring in a flow meter monitoring system (100).

18. The method of claim 10 with the flow meter type comprising a Coriolis flow meter type.

19. The method of claim 10 wherein the flow meter monitoring system comprises a flow meter component.

20. A software product for determining a flow meter type of a flow meter, comprising:
    a control software configured to direct a processing system to receive meter calibration values for the flow meter and correlate the meter calibration values to known meter calibration values (114) in order to determine the flow meter type; and
    a storage system that stores the control software.

21. The software product of claim 20 with the meter calibration values comprising a Flow Calibration Factor (FCF).

22. The software product of claim 20 with the meter calibration values comprising a quiescent harmonic frequency (K1) value.

23. The software product of claim 20 with the known meter calibration values (114) comprising a data structure that links a specific flow meter type to a specific set of meter calibration values.

24. The software product of claim 20 further comprising storing the determined flow meter type in a data structure along with a flow meter identifier of the flow meter.

25. The software product of claim 20 wherein the meter calibration values for the flow meter are received from the flow meter.

26. The software product of claim 20 wherein the meter calibration values for the flow meter are received through a user interface (130).

27. The software product of claim 20 with the correlating occurring in a flow meter monitoring system (100).

28. The software product of claim 20 with the flow meter type comprising a Coriolis flow meter type.

29. The software product of claim 20 wherein the flow meter monitoring system comprises a flow meter component.

* * * * *

UNITED STATES PATENT AND TRADEMARK OFFICE
CERTIFICATE OF CORRECTION

| | | |
|---|---|---|
| PATENT NO. | : 7,523,639 B2 | Page 1 of 1 |
| APPLICATION NO. | : 10/581735 | |
| DATED | : April 28, 2009 | |
| INVENTOR(S) | : Paul J. Hays | |

It is certified that error appears in the above-identified patent and that said Letters Patent is hereby corrected as shown below:

Column 4, line 30, replace "a K value (same as K1 but for" with -- a K2 value (same as K1 but for --

Signed and Sealed this

Twenty-third Day of June, 2009

JOHN DOLL
*Acting Director of the United States Patent and Trademark Office*